H. LIEBMANN.
VEGETABLE SLICER.
No. 69,228.            Patented Sept. 24, 1867.
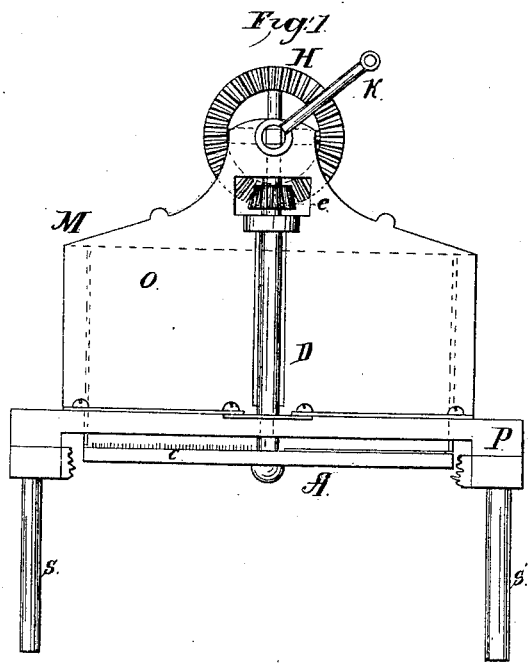
Fig. 1.
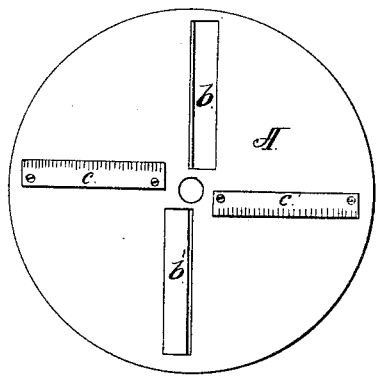
Fig. 2.
Fig. 3.
Witnesses:
Saml. S. Boyd.
Henry T. Carter.
Inventor:
Herman Liebmann
by Boyd & Co. Atty.

United States Patent Office.

HERRMANN LIEBMANN, OF MASCOUTAH, ILLINOIS.

*Letters Patent No. 69,228, dated September 24, 1867.*

IMPROVED VEGETABLE-SLICER.

*The Schedule referred to in these Letters Patent and making part of the same.*

TO ALL WHOM IT MAY CONCERN:

Be it known that I, HERRMANN LIEBMANN, of Mascoutah, in the county of Saint Clair, State of Illinois, have invented a new and useful Improved Vegetable-Slicer, of which the following is a full, clear, and exact description, reference being had to the annexed drawing, making a part of this specification, in which—

Figure 1 represents an elevation of my invention with a portion of the frame removed.

Figure 2 represents a top view of the revolving disk.

Figure 3 represents an end view of the vertical knife-frame, showing one of the blades.

Similar letters indicate like parts.

My invention is designed to produce a machine which shall rapidly slice vegetables of all kinds, be easily worked, and of simple and cheap construction. It consists of a circular disk, A, figs. 1 and 2, having upon its upper surface two or more lateral knives, $b\ b'$, fig. 2, with their edges raised slightly from the surface of the disk, and two or more sets of vertical knives, $c\ c'$, figs. 1 and 2, at right angles to the disk. With the disk is connected an upright driving-shaft, D, fig. 1, which, at its extremity, $e$, fig. 1, makes a bevelled gear with the wheel H, fig. 1, whose axis is at right angles with the shaft D. A crank, K, attached to the axis of the wheel H, sets the whole in motion. A trough, M, fig. 1, is placed around the front of the machine, and is fastened to the solid support O of the wheel H. The whole rests upon an open frame, P, fig. 1, supported upon legs, two of which are shown at $s\ s'$, fig. 1.

The trough being filled with vegetables and the disk put in motion, the vertical knives $c\ c'$ cut the same vertically, while the lateral knives, following at each revolution, cut a thin slice from the vegetables already cut vertically, which passes between the blade and the disk down into the vessel ready to receive it. When it is desired to merely slice the vegetables the vertical knife-frames may be removed by unscrewing the same from the disk.

The advantages of my invention consist in so combining a vertical and horizontal cutting of the vegetables as to insure their complete reduction to small pieces.

I do not claim to be the first inventor of a vegetable-slicer combining vertical and lateral knives, nor of the use of a revolving disk, but what I do claim as my invention, and desire to secure by Letters Patent, is—

A vegetable-slicer, having fixed lateral knives, and vertical knives that may be removed, attached to a revolving horizontal disk, when constructed and arranged substantially as shown and specified.

HERRMANN LIEBMANN.

Witnesses:
SAM'L S. BOYD,
HENRY T. CARTER